April 15, 1969 H. C. HANSEN 3,438,635

PHONOGRAPHS

Filed Feb. 14, 1966 Sheet 1 of 4

INVENTOR
HANS CHRISTIAN HANSEN

BY Dicke + Craig
ATTORNEYS

April 15, 1969 H. C. HANSEN 3,438,635

PHONOGRAPHS

Filed Feb. 14, 1966 Sheet 2 of 4

INVENTOR

HANS CHRISTIAN HANSEN

BY Dicke & Craig

ATTORNEYS

INVENTOR
HANS CHRISTIAN HANSEN

BY Dicke + Craig
ATTORNEYS

INVENTOR
HANS CHRISTIAN HANSEN

BY Dicke & Craig
ATTORNEYS

United States Patent Office 3,438,635

Patented Apr. 15, 1969

3,438,635

PHONOGRAPHS

Hans C. Hansen, 14 Christiansholmsvej, Copenhagen, Denmark

Filed Feb. 14, 1966, Ser. No. 527,323
Claims priority, application Great Britain, Feb. 15, 1965, 6,451/65
Int. Cl. G11b *25/04*
U.S. Cl. 274—9 15 Claims

ABSTRACT OF THE DISCLOSURE

A phonograph with a turntable, a tone arm carrying a stylus to engage the playing groove of a record supported on the turntable and a control mechanism for controlling the operation of the phonograph which includes a first reciprocable control member movable from an inoperative position to an operative position and provided with a cam surface which is engaged by an abutment carried on a second reciprocable member that is operatively connected with the tone arm so that the tone arm is swung inwardly to the preselected start-of-play position by reciprocation of the first member from its inoperative position; a third member that moves substantially at right angle to the direction of movement of the first member is engaged by the abutment on the second member and in effect forms a brake against inward movement of the tone arm; a rotatable control member controls the third member so as to move to its inoperative position in response to completion of the inward movement of the tone arm.

The present invention relates to a phonograph having control means operable to raise the tone-arm to enable it to be swung in a horizontal level above the surface of a record which is supported on the phonograph turntable.

It is a purpose of the invention to provide a simple and inexpensive control mechanism which in addition to the raising of the tone-arm provides for swinging movement thereof under influence of brake means which is released automatically upon completion of the swinging movement.

Figure 1:
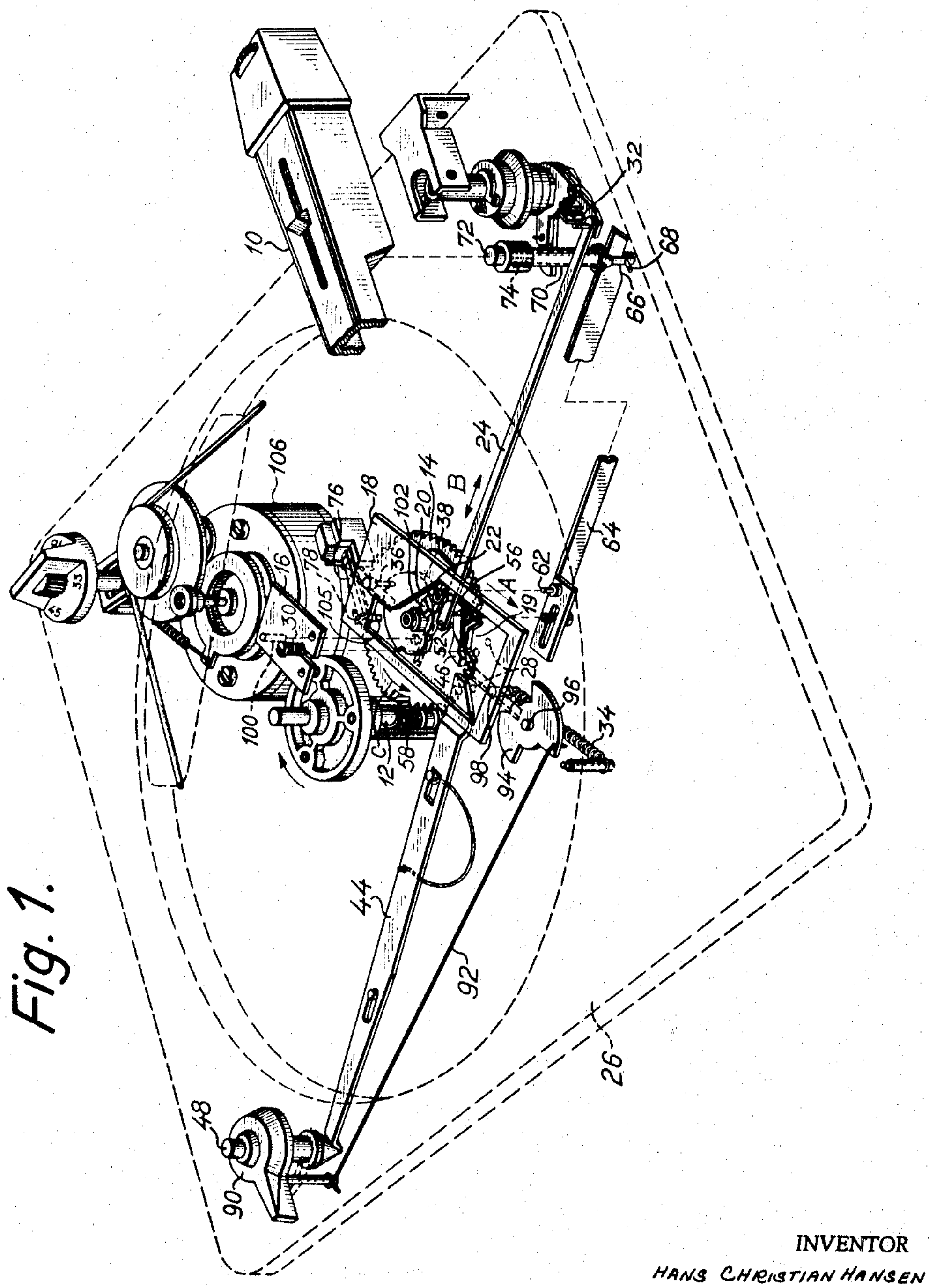
Figure 2:
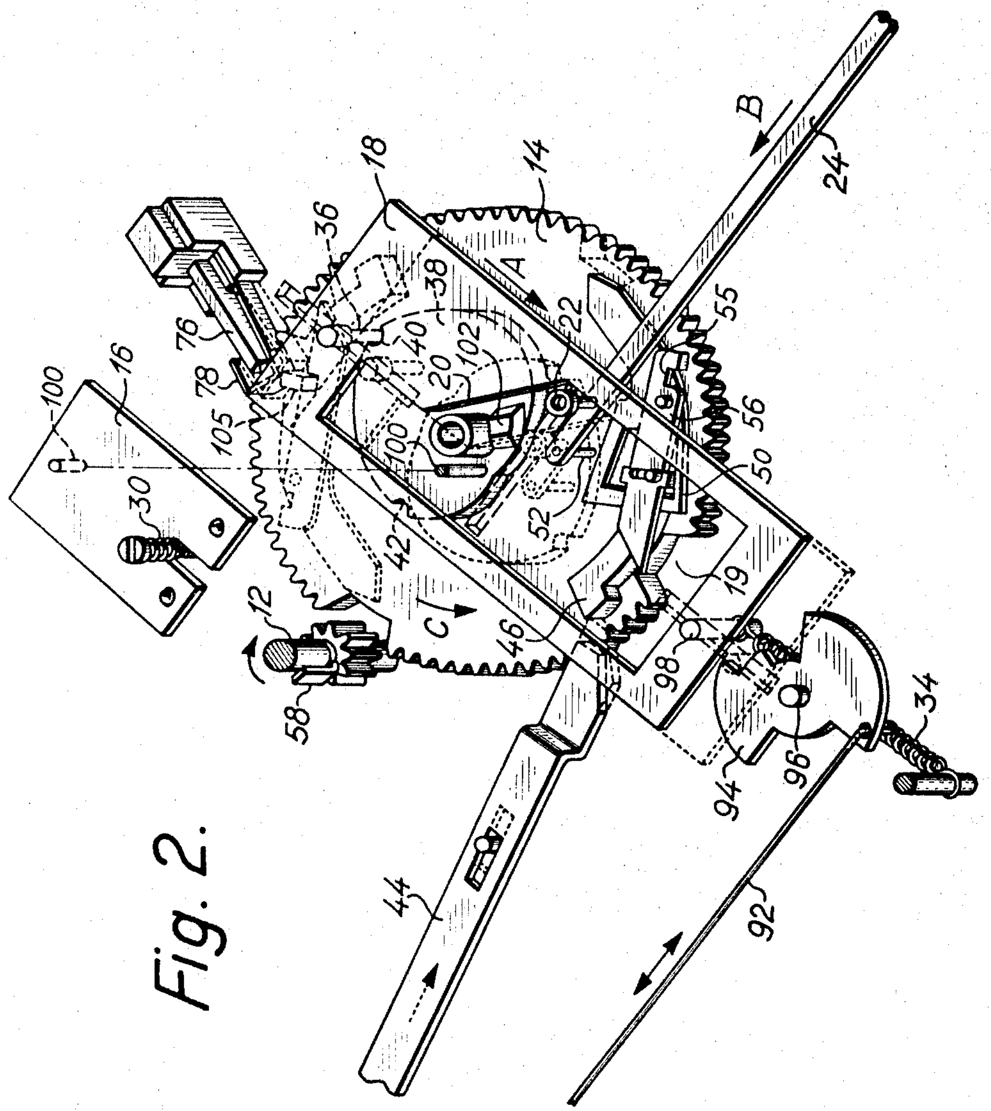
Figure 3:
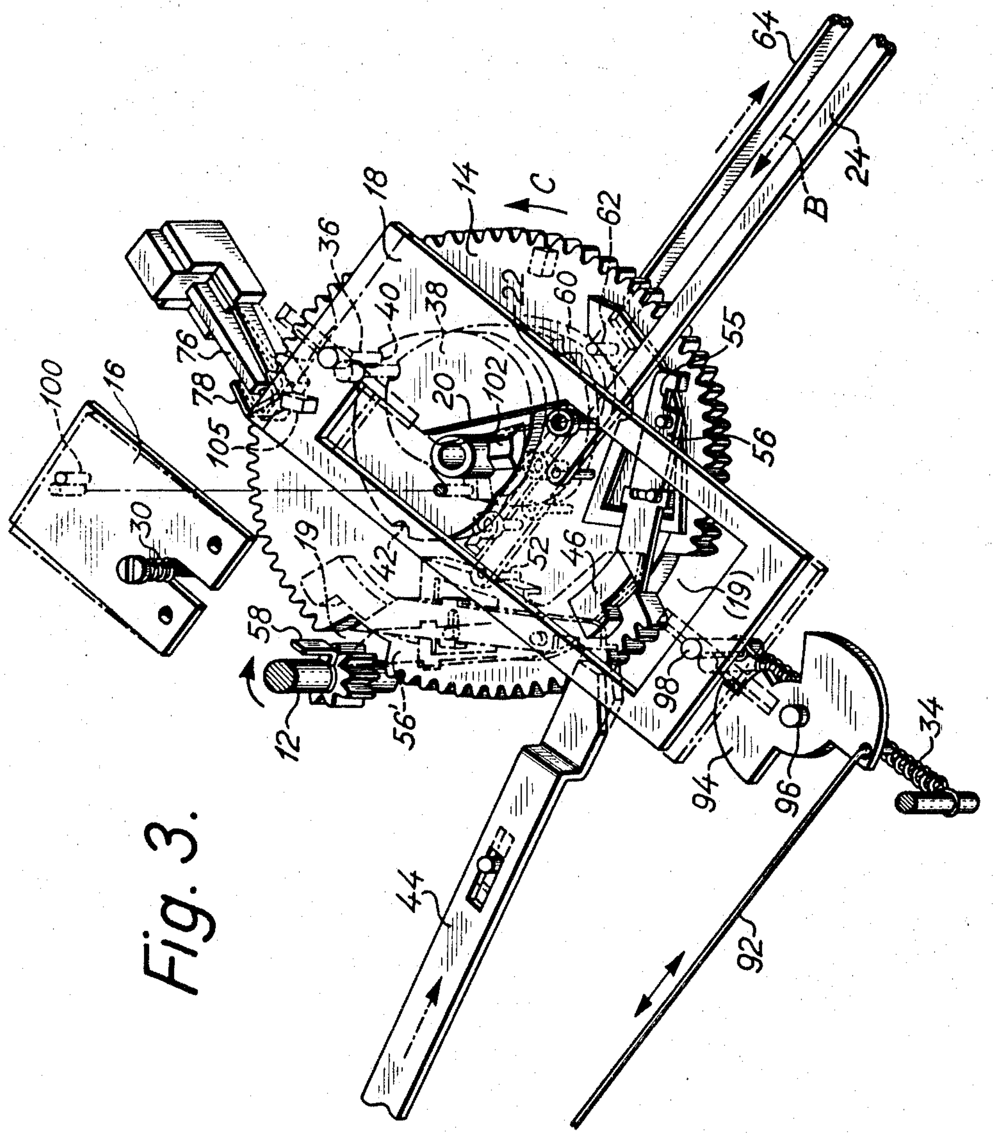
Figure 4:
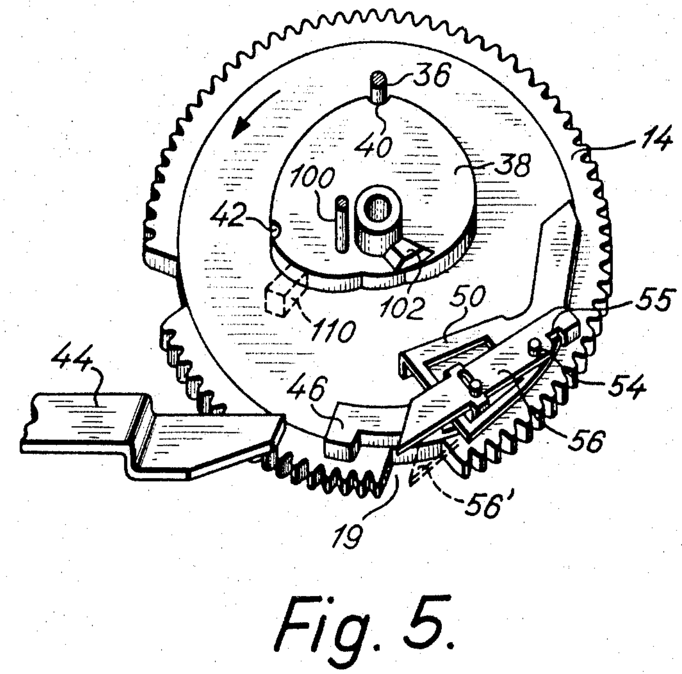
Figure 5:
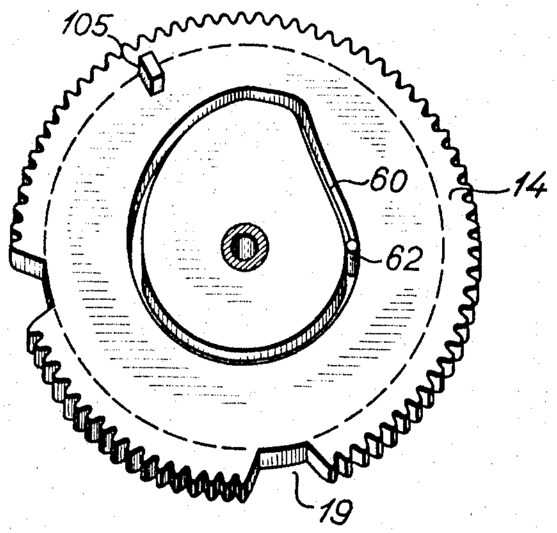

The invention will be described in the following with reference to the accompanying drawing, in which FIGURE 1 is a general perspective view of the parts of a phonograph according to the invention, FIGURE 2 is a perspective view of the essential parts of the control mechanism of the phonograph of FIGURE 1, illustrating the parts in two different positions, FIGURE 3 is a perspective view in similarity with FIGURE 2, showing the parts of the control mechanism in further positions, FIGURE 4 is a perspective view of the top side of the cam member of the control mechanism of FIGURES 2 and 3, and FIGURE 5 is the bottom side of the cam member of FIGURE 4, seen from the top.

In broad terms the phonograph to be described in more details in the following has a tone-arm 10 with a pick-up head (not shown), adapted to carry stylus means for playing the top side of a record which is supported on a turntable (not shown) which is rotatably supported on a turntable spindle 12.

Control means are provided in the phonograph, operable to raise the tone-arm to a level enabling it to be swung above the surface of the record which is supported on the turntable against the friction of brake means which is adapted to be released when the swinging movement of the tone-arm to start-of-play position has been completed.

The simplified control means of the mechanism illustrated in the drawings utilizes a rotatable cam member 14 as control means for raising and lowering the tone-arm as well as to render a brake member 16 against the friction of which the tone-arm is swinging effective and ineffective.

The swinging movement of the tone-arm is, however, not controlled from the cam member 14, but by means of a member 18 with a cam surface 20. The member 18 is biased for reciprocation in the direction of the arrow A, when it is released in response to initiation of the movement of the cam member 14 when the tone-arm has been raised whereby the cam surface 20 engages an abutment 22 on a reciprocable lever 24 to thereby cause the swinging movement of the tone-arm inwardly to start-of-play position. During the swinging movement of the tone-arm the abutment 22 is in addition to be engaged by the cam surface 20 into engagement with the brake member 16 which, however, upon completion of the swinging movement is rendered ineffective by means of the cam member 14.

Hereby a phonograph is produced which in the embodiment illustrated in the drawings by means of simple and inexpensive control means is provided with an automatic movement of the tone-arm to the start-of-play position of the record.

In this embodiment the phonograph illustrated can be compared with phonographs available on the market of the type usually referred to in the trade as semi-automatic single players.

Such semi-automatic single players are provided with a manually operable control member by means of which a mechanism operable to raise and lower the tone-arm can be rendered effective and ineffective. When the tone-arm is raised, a brake member is effective so that the tone-arm can be swung inwardly by hand to the desired position for start-of-play, and when in the desired start-of-play position the control member is operated to render the tone-arm raising mechanism ineffective, the tone-arm is lowered and at the same time the brake is rendered ineffective so as to enable the tone-arm to swing freely during the playing of the record. Some of these semi-automatic single players have in addition means operatively connected with a trigger mechanism to render the tone-arm raising mechanism effective to raise the tone-arm after termination of the playing of the record. With the present requirements for low needle pressure it has also become necessary in semi-automatic single players to include means adapted to cause the lowering of the tone-arm to engage its stylus with the top surface of the record very gently. Such means are in many cases in the form of small cylinders in which a piston is movable slowly in a fluid of high viscosity. Mechanisms of this kind are, however, high precision engineering jobs which are rather expensive.

The mechanism of the phonograph according to the present invention not only performs the operation of high precision engineering devices in the known semi-automatic players, but it performs these functions by means of a mechanism which does not require any high precision engineering in which in addition to the gentle raising and lowering of the tone-arm provdes for automatic swinging of the tone-arm at least to a plurality of start-of-play positions. In addition, the mechanism according to the invention can, if desired, without any extra costs be designed also to move the tone-arm to a position outside the periphery of the turntable upon completion of the playing of a record, and inasfar as the mechanism makes use of a rotatable cam member it is also applicable to an automatic record changer.

The further details of the structure illustrated will be understood from the following description in connection with the description of the mode of operation.

The cam member 18 is mounted for reciprocation by means of pins guided in slots in the unit plate 26 or preferably in a specially made insert (not shown) which is firmly secured to the unit plate. Also the lever 24 is by means of a pin-and-slot connection guided for reciprocation in the direction of the arrow B. The brake member 16 is in the form of a plate which adjacent one edge is pivotally supported on a pair of ball points 28 (FIG. 1) and is influenced by a spring 30 which urges the brake plate downwardly. The downwardly titled position of the brake plate is the effective position in which the top of the abutment 22 engages the underside of the brake plate 16 and thereby causes a friction against reciprocation of the lever 24 and thereby swinging movement of the tone-arm. The other end of the lever 24 is at 32 pivotally connected with the tone-arm. In the connection the lever 24 and the tone-arm suitable resilient means is provided so that no jamming of the mechanism can take place even if the tone-arm is moved by hand during the automatic cycle.

As bias means for the cam member 18, 20 a spring 34 is provided. Adjacent the other end the cam member 18, 20 is provided with a pin 26 which is adapted to engage a specially shaped cam member 38 on the top surface of the cam disc in which a pair of notches 40 and 42 are provided corresponding to two positions of the cam member to be described in more details in the following.

For manual start of the cam disc 14 from its neutral position a reciprocable lever 44 is provided to engage an abutment 46 on the cam disc when the lever is reciprocated by depression of a control knob 48.

For automatic start of the cam disc after termination of the playing of the record, a trigger mechanism which is most clearly illustrated in FIGURE 4 is pivotally supported on the top surface of the cam disc. This trigger mechanism comprises a first lever 50 which is adapted to be swung under influence of the inward movement of the tone-arm by engagement with the pin 52 on the left hand end of the lever 24 during the last part of the playing of the record when the trigger mechanism is in the position shown in dash and dotted lines in FIGURE 3. On the trigger mechanism pivot 54 a second lever 56 is provided which is adapted to participate in the swinging movement of the lever 50, but which can be swung back against very little friction when a striker 58 on the turntable spindle 12 engages the end of the lever 56 during each revolution of the turntable as long as the trigger mechanism is actuated in response to inward movement of the tone-arm corresponding to normal pitch of the record groove. When, however, the stylus enters into the outlet groove of the record which has increased pitch, the angular movement of the trigger mechanism levers is increased so that the striker 58 will come into effective engagement with the end 56' of the striker lever 56 when the latter is swung to the most exterior position relatively to the periphery of the cam disc whereby the cam disc will be started.

As apparent from FIGURE 4, the trigger lever 50 is provided with two parts on each side of the pivot. These parts are so dimensioned that the trigger lever is substantially in balance and will not be caused to swing under influence of any centrifugal forces which occur during rotation or stop of the cam disc. As will also be obvious the trigger mechanism is of relatively small dimensions whereby the parts can be of very light weight so that the trigger mechanism operates safely even with very low needle pressure.

The raising and lowering of the tone-arm is controlled by means of a track 60 in the underside of the cam disc in which a pin 62 on a reciprocable lever 64 engages. The right hand end of the lever 64 is provided with a cam surface 66 which engages an abutment 68 of a lift control member 72 which is reciprocable in vertical direction in a stationary support 70 and by being reciprocated upwardly raises the tone-arm. A spring member 74 is provided in this mechanism adapted to yield so as to prevent jamming of the parts if the tone-arm is pressed downwardly during the automatic cycle.

Adjacent the periphery of the cam disc a switch 76 for the phonograph motor is provided with a control spring 78 which is adapted to be engaged by an abutment 105 on the underside of the cam disc so as to open the switch in the inoperative position of the cam disc.

In order to provide for a preselectable number of start-of-play positions a rotatable selector knob 90 is provided which through a lever 92 is connected with a disc 94 which is mounted on a pivot 96 and which is provided with a plurality of abutments which by adjustment of the knob 90 can be rendered effective to be engaged by a pin 98 on the reciprocable cam member 18, 20.

In order to tilt the brake plate 16 and thereby render the brake ineffective a pin 100 is provided which extends downwardly from the brake plate and is adapted to be engaged by a cam member 102 on the cam disc.

106 is the phonograph motor which through a suitable gear with speed selector means is adapted to drive the turntable at a plurality of preselected speeds.

In operation the neutral or inoperative position of the parts with the phonograph motor switched off is the position illustrated in FIGURE 1 and shown in full lines in FIGURE 2.

When it is desired to play a record of the predetermined size, for example a 12 inch record, the record is placed on the turntable and the record size selector knob 90 is adjusted to correspond to landing of the stylus on a 12 inch record. Thereby the appropriate one of the abutments on the disc member 94 is brought into operative position.

The phonograph is thereafter started by pressing the push button 48. This gives the cam disc 14 an initial push which is sufficient to bring the switch abutment 105 on the underside of the cam disc out of engagement with the switch spring 78 and thereby cause the switch to be closed. Simultaneously, the pin 36 will be disengaged from the notch 40 and thereafter be brought into engagement with a portion of the cam member 38 which has such a configuration that the bias exerted by the spring 34 will contribute to the rotation of the cam disc and secure safe engagement between the pinion on the turntable spindle and the teeth in the periphery of the cam disc.

When the cam disc thereafter moves in the direction of the arrow C of FIGURE 2, the cam member 18, 20 reciprocates in the direction of the arrow A whereby the engagement between the cam surface 20 and the pin 22 on the lever 24 causes the lever 24 to reciprocate in the left hand direction whereby the tone-arm is swung inwardly. The position shown in FIGURE 2 in dotted lines is that intermediate position which corresponds to start-of-play position. In this position the pin 98 on the front end of the cam member 18 has been brought into engagement with the selected one of the abutments on the disc 94 whereby further reciprocation of the member 18 is prevented. During this movement also the brake 16 is still effective, because the spring 30 tilts the brake plate downwardly to its underside in engagement with a knob 22.

The tone-arm may either be in raised position in the neutral position of the parts, or the track 60 in the underside of the cam disc may be of such a configuration that the tone-arm is lifted immediately when the cam disc is started.

The fact that the brake is effective, means that when the tone-arm in lifted position is swung into start-of-play position, the brake will still be effective in this position and will remain effective until the cam disc has been rotated to the position shown with dash and dotted lines in FIGURE 3. In this position the cam disc rotation is stopped, because the cam disc is provided with the second peripheral notch 19 adjacent the rear end of the trigger mechanism 50, 56.

As obvious from the dash and dotted line position of FIGURE 3 the brake is in this position lifted so that the friction of the brake is rendered ineffective and the further reciprocation of the lever 24 can take place unobstructedly during the playing of the record.

When after termination of the playing of the record the trigger mechanism is rendered effective, the cam disc is restarted and rotates from the dash and dotted line positions of FIGURE 3 to the position shown in full lines in FIGURE 2.

Also in the dash and dotted line position of FIGURE 3 the phonograph can be stopped manually by pressing the push button 48 because the trigger lever 56 is provided with a recess 55 adapted to be engaged by the front end of the lever 44 in response to reciprocation thereof in the right hand direction.

As apparent from the foregoing description the rotation of the cam disc from the dash and dotted line position of FIGURE 3 to the full line position of FIGURE 2 does not change the position of the tone-arm in which the phonograph is stopped. It is hereby possible in the case of interruption of the listening to a record to stop the record by depressing the knob 48, whereafter the phonograph can be restarted and cause the tone-arm to remain in the same position where the phonograph was stopped and be landed again in the same position on the record.

Alternatively it is obviously within the scope of the invention to provide for automatic movement of the tone-arm in the outward direction at any time when the phonograph is caused to be stopped simply by providing an abutment 110 as indicated in dotted lines in FIGURE 4. This abutment will then engage the pin 52 on the lever 24 and cause the tone-arm to be swung outwardly.

The abutment 110 may be a firm abutment which forms an integral part of the cam disc or it may be available as optional feature, for example adapted to be countersunk in the cam disc by means of a screw or alternatively brought into operative position.

Whether it is desired to move the tone-arm outwardly automatically when the phonograph is stopped either manually or after termination of the playing of the record, or whether it is desired to be able to restart the phonograph to continue the playing of the record where it has been interrupted is an individual matter which also depends on the character of the records. In the case of education it will in most cases probably be desirable to restart the records near the point where they have been stopped so as to enable a certain passage to be repeated.

As it will be understood from the foregoing, it will be possible within the scope of the invention to provide a plurality of start positions of the reciprocable structure 18, 20 and thereby a plurality of start-of-play positions for the tone-arm. In most cases it will be sufficient to have the size selector knob 90 adjustable to the three standard sizes of records, but for special purposes markings may be provided in connection with the knob 90 to enable landing of the tone-arm at a plurality of different points on a record.

As apparent from the foregoing the control mechanism is of great simplicity inasfar as it only comprises a cam disc which due to the fact that it only controls the raising and lowering of the tone-arm can be of very small dimensions. The reciprocable cam structure 18, 20 is a simple piece which can be produced in a stamping press and all the other parts are simple parts which can be made by stamping tools and which do not require any precision engineering.

Nevertheless the mechanism provides for a gentle raising and lowering of the tone-arm and has in addition the advantage that it not only moves the tone-arm inwardly to a selected number of start-of-play positions, but also keeps the tone-arm movement under influence of the brake and only releases the brake simultaneously with landing the tone-arm on the record. The viscous fluid-tight raising and lowering mechanisms having brake means associated therewith must obviously be so constructed that the brake is released before the stylus is brought into engagement with the record.

What is claimed is:

1. A phonograph having a turntable adapted to support a record during the playing thereof, a tone-arm adapted to carry stylus means operable to engage the playing groove of the record, control means operable to swing the tone-arm from a position outside the edge of a record supported on the turntable to the start-of-play position, brake means operable to obstruct movement of the tone-arm during its swinging movement, a rotatable cam member operable to control raising and lowering of the tone-arm, and means at said cam member operable to render said brake means effective and ineffective, said swing control means including a reciprocable member having a cam surface and a movable control lever operatively connected with the tone-arm and having an abutment operable to be engaged by said cam surface during the reciprocation of said first member in one direction, said brake member being movable between an operative position operable to engage said abutment which is engaged by the cam surface and said reciprocable swing control member during the swinging movement of the tone-arm and an inoperative position disengaged therefrom.

2. A phonograph as claimed in claim 1, in which said brake means is provided with bias means and a cam engagement member and said cam member is provided with a cam portion operable to engage said cam engagement member of said brake member to move said brake member to its inoperative position against said bias means.

3. A phonograph having a turntable adapted to support a record during the playing thereof, a tone-arm adapted to carry stylus means operable to engage the playing grooves of a record during the playing thereof, a reciprocable plate having an inclined cam surface, a spring biasing said plate for reciprocation in one direction, a reciprocable lever operatively connected with said tone arm to swing said tone-arm to start-of-play position in response to reciprocation in one direction and having an abutment operable to be engaged by said cam surface of said reciprocable member in response to reciprocation of said member under the influence of said spring to thereby swing the tone-arm to said start-of-play position, a rotatable cam disc having a cam portion operatively connected with said reciprocable member to hold said reciprocable member in an inoperative position against the bias of said spring in one position of said cam member and being operable during rotation of said cam disc to enable said spring to move said reciprocable member to control the swinging of said tone-arm, a plate member having bias means normally engaging said plate member with said abutment of said swing control member of the tone-arm to provide a brake action against the movement of said tone-arm during the swinging thereof, and means operatively connecting said plate member with said cam disc operable upon completion of the swinging movement of the tone-arm to disengage said plate member from said abutments to render said brake ineffective.

4. A phonograph as claimed in claim 3, having switch-off means for said phonograph, means operable to actuate said switch-off means from said cam disc in a predetermined position thereof, means operable to retain said cam disc stationary in said switch-off position, drive means in said turntable operable to rotate said cam disc, and means on said cam disc operable to render said drive means effective.

5. A phonograph as claimed in claim 4, in which said cam disc is provided with second means operable to render said drive means for said cam disc ineffective in a position of said cam disc different from said stop position.

6. A phonograph as claimed in claim 5, in which said means on said cam disc which is operable to render said cam disc drive means effective is in the form of a trigger mechanism having a swinging lever operable to be swung in response to swinging movement of the tone-arm near the end of palying of a record, and a second lever operable to participate in said swinging movement as well as to transmit a force to said cam disc to start thereof, and in which said turntable is provided with a rotatable shaft having a striker operable to engage said second lever of said trigger mechanism during swinging movement thereof with increased velocity in response to movement of the tone-arm stylus in the outlet groove of a record.

7. A phonograph as claimed in claim 6, in which said first lever of said trigger mechanism is a two-armed lever which is substantially balanced.

8. A phonograph as claimed in claim 6, in which said phonograph is provided with manually operable start control means operatively connected with said cam disc to start the rotation thereof from said stop position, and in which said trigger mechanism is provided with means operable to be engaged by said manually operable means in the second position of said cam disc for rendering said trigger mechanism operative in response to actuation of said manually operable control means to reject a record.

9. A phonograph having a turntable adapted to support a record during the playing thereof, a tone arm adapted to carry stylus means operable to engage the playing groove of the record, control means operable to swing the tone arm from a position outside the edge of the record supported on the turntable to the start-of-play position comprising a first reciprocable control member movable from an inoperative to an operative position and having a cam means, a second reciprocable member operatively connected with the tone arm and having abutment means operable to engage said cam means to cause second member to be reciprocated to control inward swinging of the tone arm in response to reciprocation of said first member from its inoperative position, a third member movable substantially perpendicularly to the direction of movement of said first member between an operative position and an inoperative position, the abutment means on said second member being operable to engage said third member in its operative position to provide a brake action against inward movement of the tone arm during the operative position of said third member, a rotatable control member including means operable to engage the rotatable control member to move said third member to its inoperative position in response to completion of the inward movement of the tone arm.

10. A phonograph as claimed in claim 9, in which said rotatable control member is provided with positioning means operable to keep the first reciprocable member in its inoperative position.

11. A phonograph as claimed in claim 10, in which said first reciprocable member is biased against said positioning means of the rotatable control member by bias means which operates to reciprocate said first member upon release thereof from said positioning means.

12. A phonograph as claimed in claim 11, in which said rotatable control member is provided with a notch forming part of the positioning means and operable to be engaged by an abutment on said first reciprocable member, and means for retaining said rotatable member in the position with engagement between said notch and said abutment.

13. A phonograph as claimed in claim 9, in which the connecting means between the rotatable control member and the third member is in the form of a reciprocable pin movable substantially perpendicular to the direction of movement of the first reciprocable member, and in which the rotatable control member is provided with a cam means operable to reciprocate said pin in response to the completion of the movement of the tone arm to render said brake means ineffective.

14. A phonograph as claimed in claim 12, in which trigger means is provided to impart an initial movement to said rotatable control member sufficient to disengage said notch from a pin, and in which adjacent said notch, said rotatable control member is provided with a cam portion operable to be engaged by said abutment after its disengagement from said notch, said cam portion being operable to transmit the bias of said first reciprocable member to cause rotation of said rotatable control member.

15. A phonograph as claimed in claim 10, further comprising an adjustable member with a plurality of abutments each being assigned to respectively start-of-play positions of records of different sizes, means on said first reciprocable member operable to selectively engage said abutments, and manually adjustable means operable to select a desired one of said abutments on said adjustable member.

References Cited

UNITED STATES PATENTS

| | | | |
|---|---|---|---|
| 2,331,383 | 10/1943 | Faulkner | 274—10 |
| 2,558,060 | 6/1951 | Rudolph | 274—10 |
| 2,578,792 | 2/1951 | Faulkner | 274—10 |
| 2,959,419 | 11/1960 | Edema | 274—15 |
| 3,174,754 | 3/1965 | Puls | 274—23 X |

HARRY N. HAROIAN, *Primary Examiner.*